United States Patent
Shibata (10) Patent No.: US 9,019,522 B2
(45) Date of Patent: Apr. 28, 2015

(54) PRINTING APPARATUS AND METHOD FOR CONTROLING A PLURALITY OF SHEET STORAGE UNITS

(75) Inventor: Daisuke Shibata, Funabashi (JP)

(73) Assignee: Canon Kabushiki Kaisha, Tokyo (JP)

( * ) Notice: Subject to any disclaimer, the term of this patent is extended or adjusted under 35 U.S.C. 154(b) by 170 days.

(21) Appl. No.: 12/952,146

(22) Filed: Nov. 22, 2010

(65) Prior Publication Data

US 2011/0134460 A1 Jun. 9, 2011

(30) Foreign Application Priority Data

Dec. 8, 2009 (JP) .................... 2009-278946

(51) Int. Cl.
*G06F 15/00* (2006.01)
*G06F 3/12* (2006.01)
*B41J 13/00* (2006.01)
*G06K 15/00* (2006.01)
*G06K 15/16* (2006.01)

(52) U.S. Cl.
CPC ........... *G06F 3/1285* (2013.01); *B41J 13/0018* (2013.01); *G06F 3/121* (2013.01); *G06F 3/1235* (2013.01); *G06F 3/1258* (2013.01); *G06K 15/005* (2013.01); *G06K 15/16* (2013.01)

(58) Field of Classification Search
USPC ............................................. 358/1.14, 1.15
See application file for complete search history.

(56) References Cited

U.S. PATENT DOCUMENTS

| 2007/0183796 A1* | 8/2007 | Ueki et al. ................. 399/23 |
| 2009/0109471 A1* | 4/2009 | Yanazume et al. .......... 358/1.15 |
| 2009/0190936 A1 | 7/2009 | Masui et al. |

FOREIGN PATENT DOCUMENTS

| EP | 2085911 A1 | 8/2009 |
| JP | 9323457 A | 12/1997 |
| JP | 11-115280 A | 4/1999 |
| JP | 2002036679 A | 2/2002 |
| JP | 2003-266886 A | 9/2003 |
| JP | 2009-203074 A | 9/2009 |

OTHER PUBLICATIONS

Machine translation for JP2002-036679, IDS.*
Machine translation for JP 11-115280, IDS.*
Machine translation for JP 2003-266886, IDS.*
Extended European Search Report dated Jan. 30, 2013, in European Patent Application No. EP 10 19 4216.7.
Japanese Office Action dated Aug. 30, 2013 issued in corresponding Japanese Patent Application No. 2009-278946.

* cited by examiner

*Primary Examiner* — Qian Yang
(74) *Attorney, Agent, or Firm* — Fitzpatrick, Cella, Harper & Scinto (57) ABSTRACT

A printing apparatus according to this invention includes a plurality of paper feed cassettes. Upon receiving a print job which designates a paper feed cassette, the printing apparatus determines whether the paper size of the paper feed cassette designated by the print job that is stored in a memory matches the paper size needed for executing the print job. If the printing apparatus determines that these paper sizes do not match each other, it restricts execution of the print job. If a feeding unit is set while execution of the print job is restricted, the printing apparatus decides the set feeding unit as a feeding source of paper used to execute the print job. The printing apparatus feeds paper contained in the decided feeding unit, and executes the print job.

6 Claims, 7 Drawing Sheets

PRINTING APPARATUS AND METHOD FOR CONTROLING A PLURALITY OF SHEET STORAGE UNITS

BACKGROUND OF THE INVENTION

1. Field of the Invention

The present invention relates to a printing apparatus which has a plurality of feeding units and supplies paper from a designated feeding unit to form an image, and a control method therefor.

2. Description of the Related Art

There is known an image forming apparatus which has a plurality of feeding units capable of setting sheets of different sizes. This image forming apparatus can print by feeding paper of a designated size or paper from a designated feeding unit in accordance with an instruction from a host computer. The image forming apparatus starts printing when a designated paper size matches the size of paper contained in a designated feeding unit. However, if these paper sizes do not match each other, the user is generally notified of an error or a warning message to request a necessary paper size. To solve this, Japanese Patent Laid-Open No. 9-323457 describes a method of changing the size of an image in accordance with the printing paper size when the size of paper contained in a designated feeding unit does not match that of an image to be printed. However, this method may not be able to provide a print result the user wants, because the size of a printed image differs from that of an original image.

As another method, for example, an error skip button is attached to an image forming apparatus. The user presses this button to ignore an error and forcibly print on paper of a designated size. Alternatively, it is proposed that when skipping an error, an alternative paper size is set for each paper size. When paper of the alternative size is available, the image forming apparatus prints on the paper; otherwise, it does not print (Japanese Patent Laid-Open No. 2002-036679).

However, in either method described above, the user cannot obtain the printed material he wants. A touch panel may be attached to select a feeding unit different from a selected one. In this case, the user can change the feeding unit by manipulating the touch panel, but the apparatus size increases, greatly raising the cost. To obtain a printed material the user wants without changing the feeding unit, it is necessary to "replace paper contained in a selected feeding unit with paper of a size of user's choice." Even when paper of a requested size is contained in a feeding unit other than one designated by a print job, in order to change the feeding unit, it is necessary to "cancel a job once, set a feeding unit again by the print job, and print again." This increases the amount of user work.

SUMMARY OF THE INVENTION

The present invention aims to alleviate at lease one of the conventional problems. The present invention provides a low-cost arrangement capable of prompting the user to replace a feeding unit or paper contained in the feeding unit when a feeding unit designated by a print job does not contain paper of a designated size.

One aspect of the present invention provides a printing apparatus having a plurality of feeding units, comprising: a memory unit that stores a size of printing medium contained in each of the plurality of feeding units; a determination unit that, upon receiving a print job which designates a feeding unit, determines whether a size of printing medium that is stored in the memory unit and corresponds to the feeding unit designated by the print job matches the size of printing medium needed for executing the print job; a restriction unit that restricts execution of the print job when the determination unit determines that the printing medium sizes do not match each other; a decision unit that, in a case that a feeding unit out of the plurality of feeding units is set while the restriction unit restricts execution of the print job, decides the set feeding unit is a feeding source of printing medium to be used to execute the print job; and a print control unit that feeds printing medium contained in the feeding unit decided by the decision unit and executes the print job.

Another aspect of the present invention provides a control method for a printing apparatus having a plurality of feeding units and a memory unit that stores a size of printing medium contained in each of a plurality of feeding units, the method comprising: upon receiving a print job which designates a feeding unit, determining whether a size of printing medium that is stored in the memory unit and which corresponds to the feeding unit designated by the print job matches the printing medium size needed for executing the print job; restricting execution of the print job when the printing medium sizes are determined not to match each other; in a case that a feeding unit out of the plurality of feeding units is set while execution of the print job is restricted, deciding that the set feeding unit is a feeding source to be used to execute the print job; and feeding printing medium contained in the decided feeding unit, thereby executing the print job.

The present invention can minimize the operation unit of a printing apparatus that is manipulated by the user. The present invention can provide an effective measure by the user of the printing apparatus even when a feeding unit designated by a print job in the printing apparatus does not contain paper of a designated size.

Further features of the present invention will become apparent from the following description of exemplary embodiments (with reference to the attached drawings).

DESCRIPTION OF THE EMBODIMENTS

Embodiments of the present invention will be described in detail below with reference to the accompanying drawings. The following embodiments are not intended to limit the invention of the scope of the appended claims, and not all combinations of features described in the embodiments are indispensable for the means of solving the problems in the invention.

Figure 1:
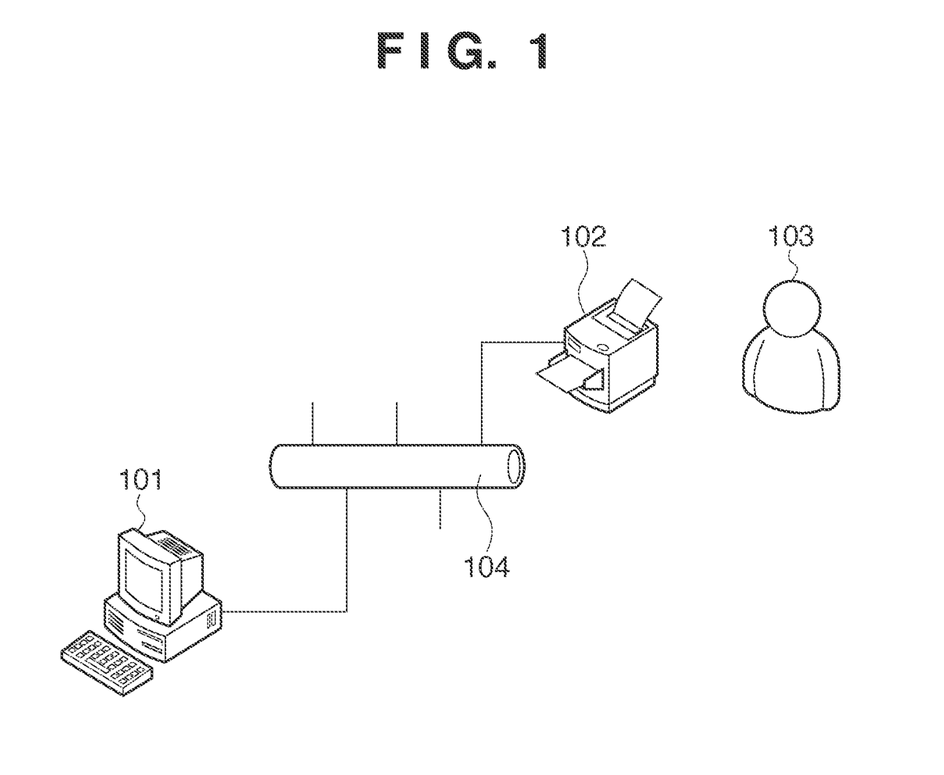
FIG. 1 is a view showing the configuration of an information processing system according to an embodiment of the present invention.

FIG. 1 is a view showing the configuration of an information processing system according to an embodiment of the present invention. In FIG. 1, a PC 101 is an information processing apparatus such as a general personal computer. A device 102 is an image forming apparatus (printing apparatus) such as a printer, and will be explained as a printer. A user 103 is an operator who operates the device 102. A network (LAN) 104 connects the PC 101 and device 102.

In the system, the PC 101 transmits a print job to the device 102. At this time, if a paper size designated by the print job does not match one set in the device 102, the device 102 notifies the user 103 of an error. Then, the user 103 selects whether to "cancel the job", "forcibly print", "replace paper", or "change the paper feed cassette (feeding unit)." The user 103 can operate an operation unit 205 (FIG. 3A) connected to the device 102 to select whether to "cancel the job" or "forcibly print." The PC 101 can issue, to the device 102, the same operation instruction as an operation on the operation unit 205. The user 103 notifies the device 102 that "paper has been replaced" by detecting whether a detachable paper feed cassette has been mounted in the feeding unit of the device 102. The user 103 designates to "change the paper feed cassette (feeding unit)" by demounting the paper feed cassette from the feeding unit of the device 102, mounting it, and operating the operation unit 205 of the device 102. The PC 101 can change the set value of the device 102. The set value of the device 102 may be changed not from the PC 101 but by operating the operation unit 205 of the device 102 by the user. As will be described later, the set value is stored in, for example, a non-volatile memory (NVMEM) 218, and includes a setting indicating whether to "cancel the job" or "forcibly print" when an error occurs. In the following description, a feeding unit having a detachable paper feed cassette will be exemplified as the feeding unit, but a feeding unit having an openable/closable front door is also usable.

Figure 2:
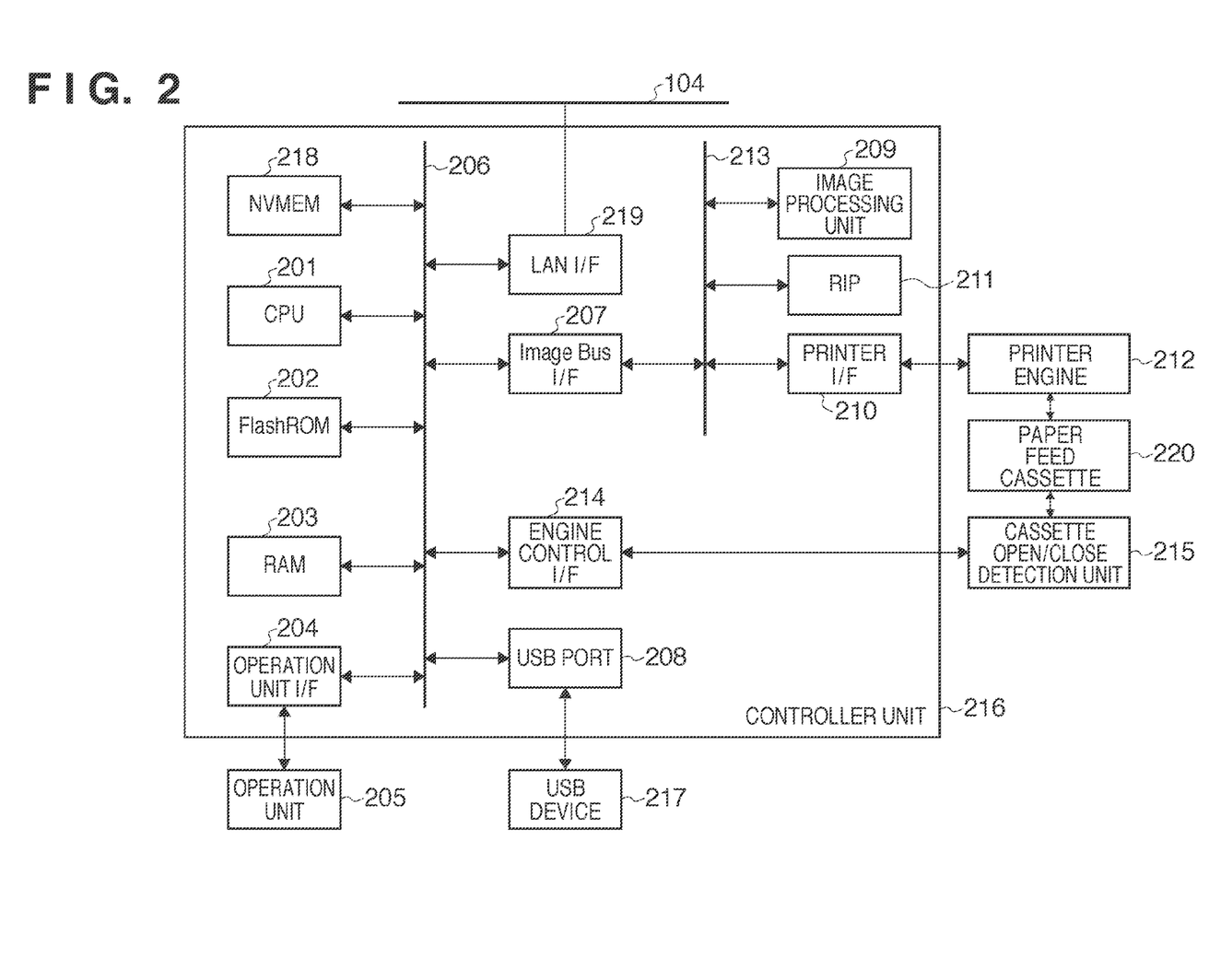
FIG. 2 is a block diagram showing the hardware configuration of a device according to the embodiment of the present invention.

FIG. 2 is a block diagram showing the hardware configuration of the device 102 according to the embodiment of the present invention. A controller unit 216 is connected to a printer engine 212 functioning as an image output device, and prints via a printer I/F 210. The printer engine 212 is connected to a paper feed cassette 220. The printer engine 212 allows mounting a plurality of paper feed cassettes 220. Each of the paper feed cassettes 220 can contain a plurality of sheets, and supplies a sheet when the printer engine 212 prints. Assume that the paper feed cassette 220 cannot detect the size of paper contained in it. Since none of a paper guide for detecting the size of paper contained in the paper feed cassette 220, a paper size setting dial, and the like is arranged, the apparatus size and cost can be reduced. The size of paper contained in the paper feed cassette 220 is written in the NVMEM 218 by the PC 101 via a LAN I/F 219.

The paper feed cassette 220 is connected to a cassette open/close detection unit 215. The cassette open/close detection unit 215 detects mounting/demounting (or opening/closing) of the paper feed cassette 220 in/from the feeding unit of the device 102. The mounting/demounting may be detected using a switch which is mechanically turned on/off by movement of a lever or the like that is synchronized with the open/close operation of the paper feed cassette, or a photosensor which optically detects the mounting/demounting operation of the paper feed cassette. However, the detection method is arbitrary. An engine control I/F 214 is an interface with the cassette open/close detection unit 215. The engine control I/F 214 transmits, from the cassette open/close detection unit 215 to the CPU 201, information indicating that the paper feed cassette has been demounted from the feeding unit of the device 102 or information indicating that the paper feed cassette has been mounted in the feeding unit. The paper feed cassette 220 includes a plurality of paper feed cassettes. Each paper feed cassette is mountable in the feeding unit of the device 102. By demounting or mounting the paper feed cassette, paper in the paper feed cassette can be confirmed or replaced.

A CPU 201 is a processor which controls the overall device 102. A RAM 203 is a system work memory for the CPU 201 to operate, and is also used as a program memory for operating a program and an image memory for temporarily storing image data. The NVMEM 218 stores setting information and the like. A flash ROM 202 is a rewritable non-volatile memory, and stores various control programs for controlling the system. A control program to be executed by the CPU 201 is stored in the flash ROM 202, and in execution, loaded into a RAM 203 and executed under the control of the CPU 201. An operation unit I/F 204 is an interface with the operation unit 205, and outputs a signal to the operation unit 205 to turn on the LED of the operation unit 205. The operation unit I/F 204 notifies the CPU 201 of information input by the user via the operation unit 205. A USB port 208 allows connecting a USB device 217. These modules are arranged on a system bus 206.

An image bus I/F 207 is a bus bridge which connects the system bus 206 and an image bus 213 for transferring image data at high speed, and converts a data structure. The image bus 213 is formed from a PCI bus or IEEE1394 bus. The following devices are arranged on the image bus 213. A raster image processor (RIP) 211 rasterizes vector data such as a PDL code into a bitmap image. The printer I/F 210 connects the printer engine 212 and controller unit 216, and performs synchronous/asynchronous conversion of image data. An image processing unit 209 performs correction, processing, and editing for input image data, and performs printer correction, resolution conversion, and the like for printout image data. In addition, the image processing unit 209 rotates image data, and executes a compression/decompression process such as JPEG for multi-valued image data, or JBIG, MMR, or MH for binary image data. The printer engine 212 prints an image on paper based on raster image data. The printing method is, for example, an electrophotographic method using a photosensitive drum and photosensitive belt, or an inkjet method of discharging ink from a small nozzle array to directly print an image on paper. However, the printing method is arbitrary.

Figure 3A:
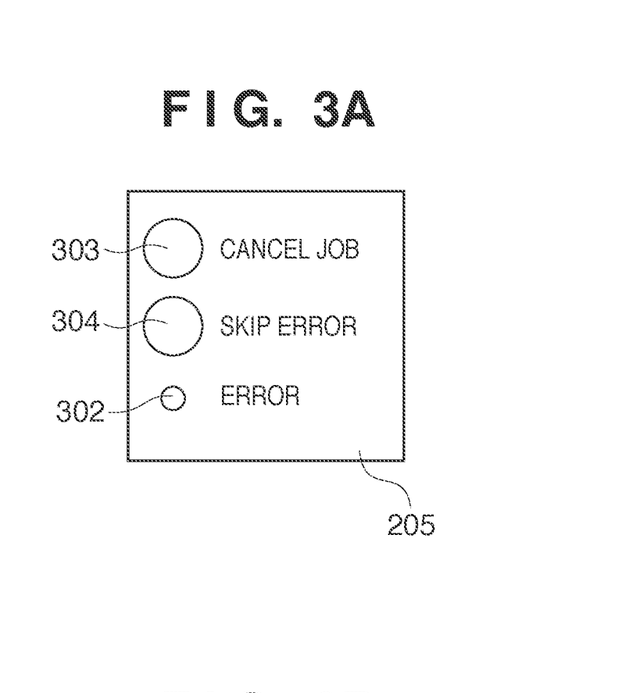
FIG. 3A is a schematic view showing the arrangement of the operation unit of the device.

The device 102 starts a print operation in response to an instruction from the CPU 201. The operation unit 205 includes an LED and various operation keys, and displays an operation screen. When the user presses a displayed key, the operation unit 205 notifies the CPU 201 of the position information of the pressed key. Note that the operation unit 205 of the device 102 according to the embodiment is as simple as possible, as shown in FIG. 3A, and is made up of only a minimum number of buttons and LEDs. The LAN I/F 219 is a functional unit for connecting the device 102 to the LAN 104, and is used to acquire the status of another device via the LAN 104 or send back a status to another device.

FIG. 3A is a schematic view showing the arrangement of the operation unit 205 of the device 102 according to the embodiment of the present invention. The operation unit 205 is connected to the operation unit I/F 204 of the controller unit 216 to input/output signals from/to the controller unit 216. More specifically, the operation unit 205 presents, to the user 103, information being notified from the CPU 201. Also, the operation unit 205 supplies, to the CPU 201, information generated by a user operation on the operation unit 205, thereby inputting information from the user 103. An error LED 302 is turned on upon occurrence of an error to notify the user 103 that the error has occurred. A job cancel button 303 is used to accept a job cancel request from the user 103. An error skip button 304 is used to accept an error skip request from the user 103. In this manner, the operation unit 205 according to the embodiment has a minimum number of LEDs and buttons. Minimizing the number of buttons of the operation unit 205 can reduce the cost and apparatus size, compared to arranging an expensive operation unit such as a touch panel.

Figure 3B:
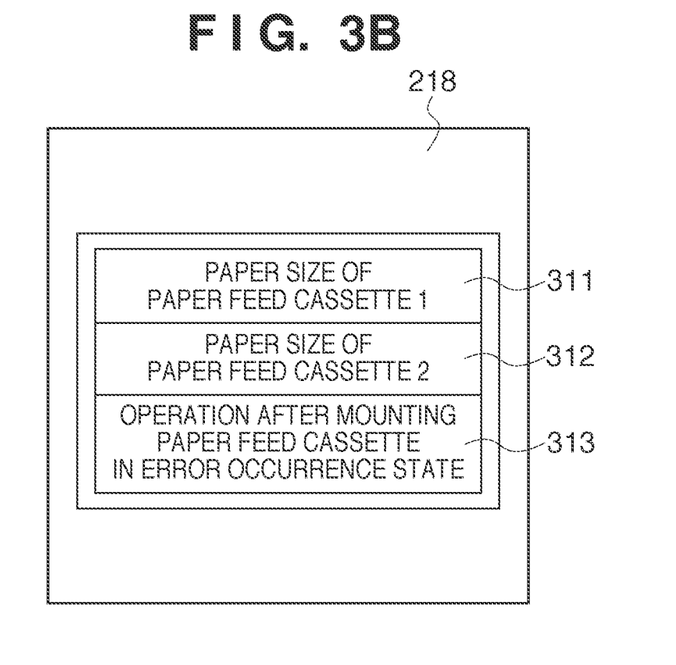
FIG. 3B is a view schematically showing information set in a non-volatile memory.

FIG. 3B is a view schematically showing values set in the non-volatile memory 218 of the controller unit 216. In FIG. 3B, areas 311 and 312 store the sizes of sheets contained in paper feed cassettes 1 and 2, respectively. Although two storage areas are set in correspondence with two paper feed cassettes 1 and 2, the number of areas is set in accordance with the number of paper feed cassettes. An area (setting information storage unit) 313 stores setting information about an operation after, upon occurrence of an error, the paper feed cassette is demounted from the feeding unit and then mounted. Note that the "paper feed cassette is demounted" includes a state in which the paper feed cassette is pulled out by the user, that is, a state in which it is demounted and is not in physical contact with the device 102, and also includes a state in which it is supported by a support portion such as a rail and is not so mounted as to be able to feed paper to the device 102. In contrast, the "paper feed cassette is mounted" means a state in which the paper feed cassette is mounted in the feeding unit of the device 102 so as to be able to feed paper to the device 102.

A set value stored in the non-volatile memory 218 can be changed by the PC 101 via the LAN I/F 219, or via the operation unit 205 of the device 102. In the following description of the embodiment, a value is set from the PC 101.

Figure 4:
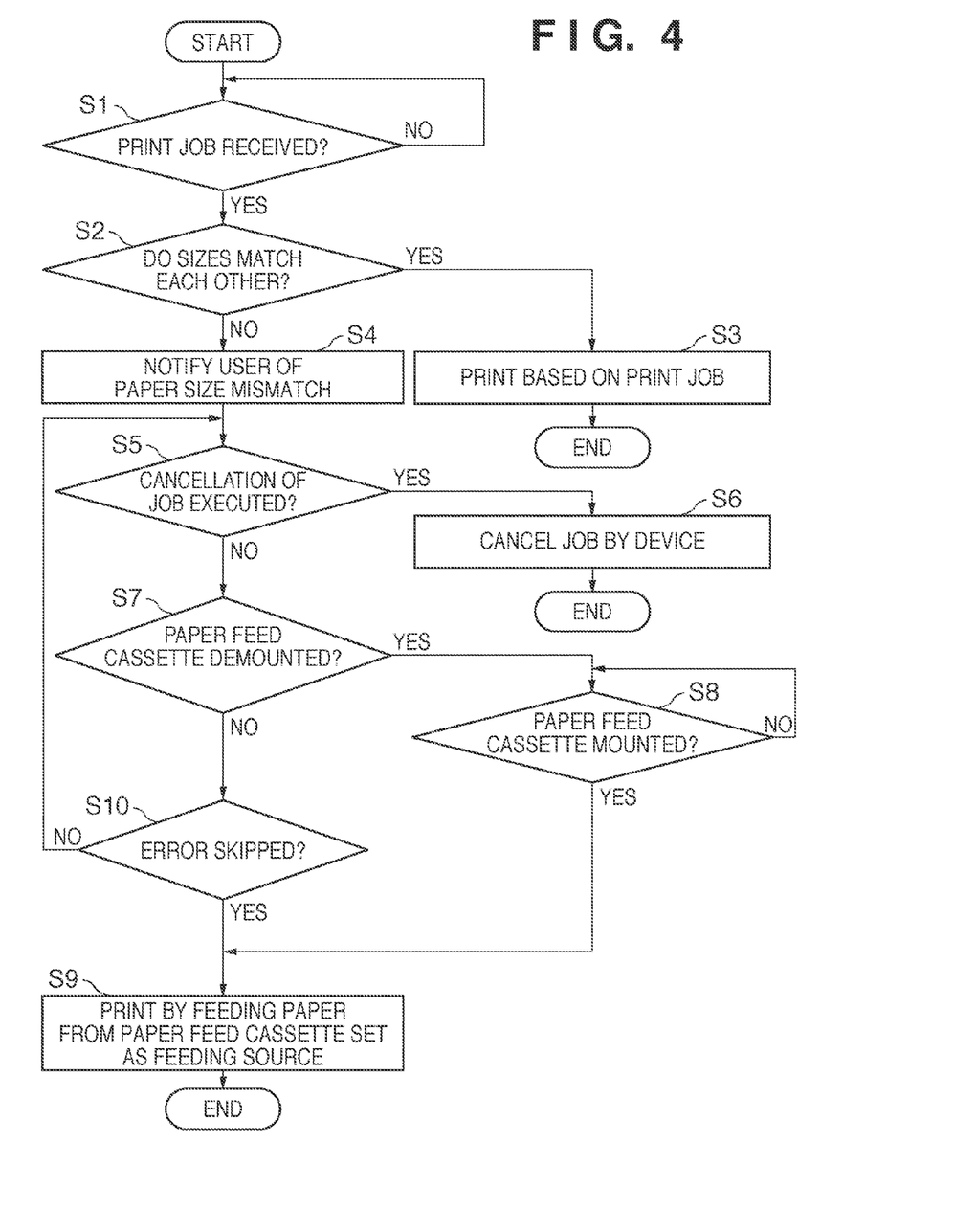
FIG. 4 is a flowchart for explaining processing by the device according to the embodiment of the present invention.
Figure 5:
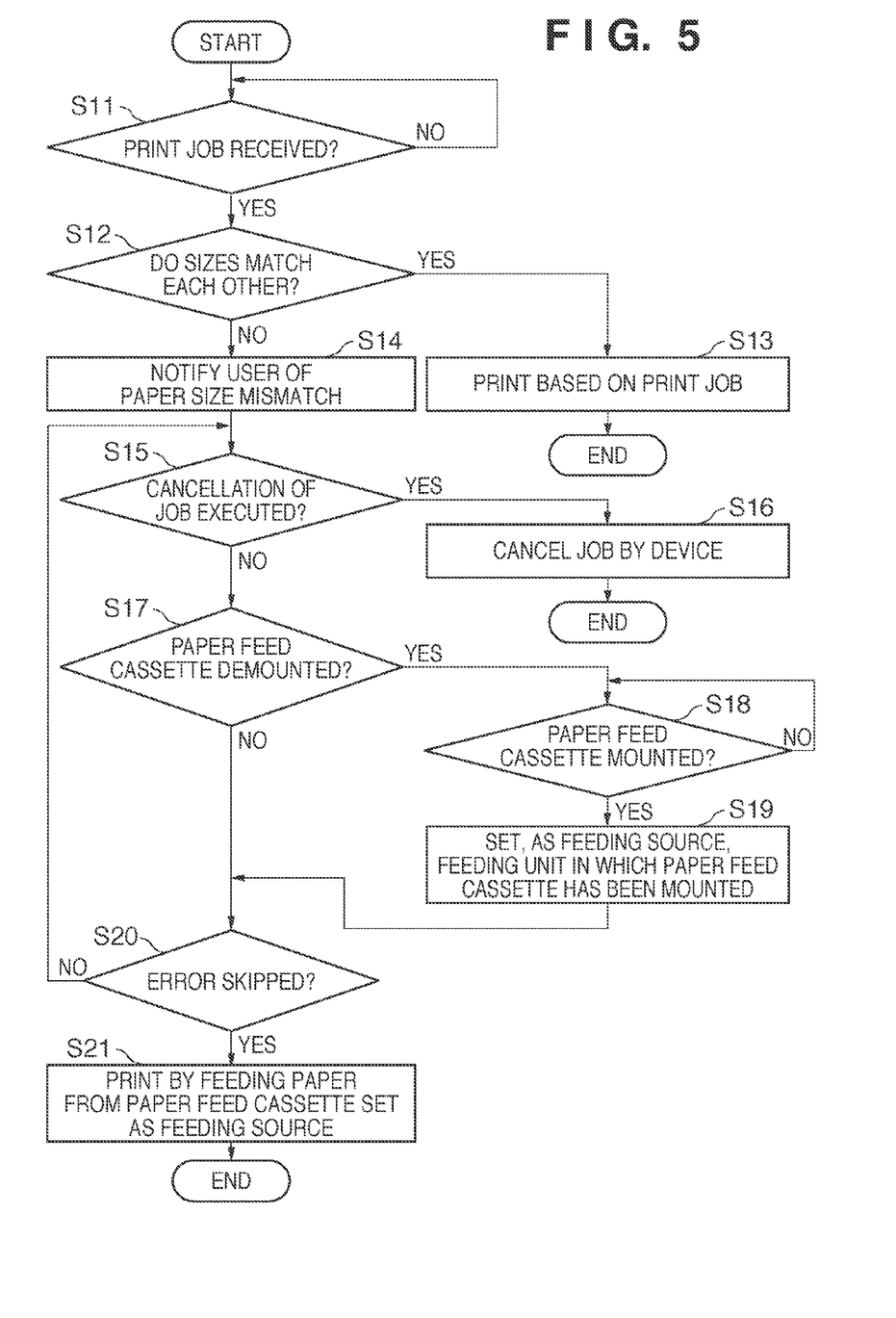
FIG. 5 is a flowchart for explaining processing by the device according to the embodiment of the present invention.

A control sequence according to the embodiment will be described with reference to FIGS. 4 and 5. FIG. 4 shows a control example when a paper feed cassette is demounted and then mounted, and paper is fed from a feeding source which is not a feeding unit in which the paper feed cassette has been newly mounted, but a feeding unit designated by a print job. FIG. 5 shows a control example when a paper feed cassette is demounted and then mounted, and paper is fed from a feeding source which is a feeding unit in which the paper feed cassette has been newly mounted. In the embodiment, which of processes set by the user in advance is to be executed is switched based on a value set by the user 103.

FIG. 4 is a flowchart for explaining print control processing by the device 102 according to the embodiment. A program for executing this processing is loaded into the RAM 203 in execution, and executed under the control of the CPU 201. Note that this processing mainly explains a case in which a print job received from the PC 101 designates a paper feed cassette (feeding unit) and paper size, and the designated paper feed cassette of the device 102 does not contain paper of the designated size. This processing is premised on that paper of the designated size is loaded into the paper feed cassette designated by the print job, instead of changing the paper feed cassette (feeding unit).

In S1, the device 102 receives a print job transmitted from the PC 101. The process then advances to S2, and the device 102 determines whether a paper size designated by the print job received in S1 matches a paper size set value stored in either the area 311 or 312 of the non-volatile memory 218 for the paper feed cassette designated by the print job. If the device 102 determines that the paper sizes match each other, the process advances to S3 to print based on the print job.

If the device 102 determines in S2 that the paper sizes do not match each other, the process advances to S4, and the device 102 turns on the error LED 302 of the operation unit 205 to notify the user that execution of the print job is restricted because an error, that is, a paper size mismatch has occurred. Thereafter, the process advances to S5, and the device 102 determines whether the job cancel button 303 has been pressed. If the device 102 determines that the job cancel button 303 has been pressed, the process advances to S6, and the device 102 discards the print job. If the device 102 determines in S5 that the job cancel button 303 has not been pressed, the process advances to S7, and the device 102 uses the cassette open/close detection unit 215 to determine whether a paper feed cassette has been demounted from the feeding unit of the device 102. If the device 102 determines that a paper feed cassette has been demounted, the process advances to S8. In S8, if the device 102 detects that the paper feed cassette has been mounted in the feeding unit of the device 102, it determines that paper in the paper feed cassette has been replaced (set), and the process advances to S9. In S9, the device 102 prints by feeding paper from the paper feed cassette 220 designated by the print job. If the device 102 determines in S7 that a paper feed cassette has not been demounted, the process advances to S10, and the device 102 determines whether the error skip button 304 has been pressed. If the device 102 detects that the error skip button 304 has been pressed, the process advances to S9, and the device 102 ignores the paper size mismatch and starts executing the print job. The feeding source at this time is a feeding source originally designated by the print job. In S9, the device 102 prints, on paper, an image of a size printable on paper. The device 102 may reduce the image to a size printable on paper and print it. If the device 102 determines in S10 that the error skip button 304 has not been pressed, the process returns to S5 to execute the above-described processing.

Hence, when paper of a designated size is not contained in a paper feed cassette (feeding unit) designated by a print job, paper of the designated size can be loaded into the paper feed cassette to perform printing. In this way, when an error due to a paper size mismatch occurs, and it is detected that a paper feed cassette was demounted once and then has been mounted, it is determined that paper in the paper feed cassette of the feeding unit has been replaced with paper of the designated size. That is, an operation of setting paper in a feeding unit is detected by detecting mounting of a paper feed cassette in the feeding unit. The feeding unit in which the paper feed cassette has been mounted is specified as a feeding source for the print job.

FIG. 5 is a flowchart for explaining print control processing by the device 102 according to the embodiment. A program for executing this processing is loaded into the RAM 203 in execution, and executed under the control of the CPU 201. Note that this processing is premised on that, when a print job designates a paper feed cassette and paper size, and the designated paper feed cassette of the device 102 does not contain paper of the designated size, the paper feed cassette (feeding unit) serving as a feeding source is changed.

Processes in S11 to S17 of FIG. 5 are the same as those in S1 to S7 of FIG. 4 described above, and a description thereof will not be repeated. In S17, the device 102 uses the cassette open/close detection unit 215 to determine whether a paper feed cassette has been demounted from the feeding unit of the device 102. If the device 102 determines that a paper feed cassette has been demounted, the process advances to S18, and the device 102 determines whether the paper feed cassette has been mounted in the feeding unit of the device 102. If the device 102 determines that the paper feed cassette has been mounted, it determines that the paper feed cassette has been changed to one which contains paper of the designated size. The process then advances to S19 to specify the mounted paper feed cassette, from among a plurality of paper feed cassettes of device 102, as a paper feed cassette serving as a feeding source, and to S20. In S21, the device 102 prints by feeding paper from the paper feed cassette set (specified) as a paper feed cassette serving as a feeding source.

As described above, when paper of a designated size is not contained in a paper feed cassette designated by a print job, the paper feed cassette serving as a feeding source is changed to one which contains paper of the designated size, and printing is performed. In this fashion, when an error due to a paper size mismatch occurs, and a paper feed cassette is demounted from the feeding unit and then mounted in it, it is determined that the paper feed cassette in the feeding unit has been changed to one which contains paper of the designated size. The user can set which of the processes shown in FIGS. 4 and 5 is performed.

Second Embodiment

The first embodiment has described an example in which printing starts when it is detected that a paper feed cassette was demounted from the feeding unit and then has been mounted. The second embodiment will explain an example in which the user sets whether to start printing when it is detected that a paper feed cassette was demounted from the feeding unit and then has been mounted.

Figure 6:
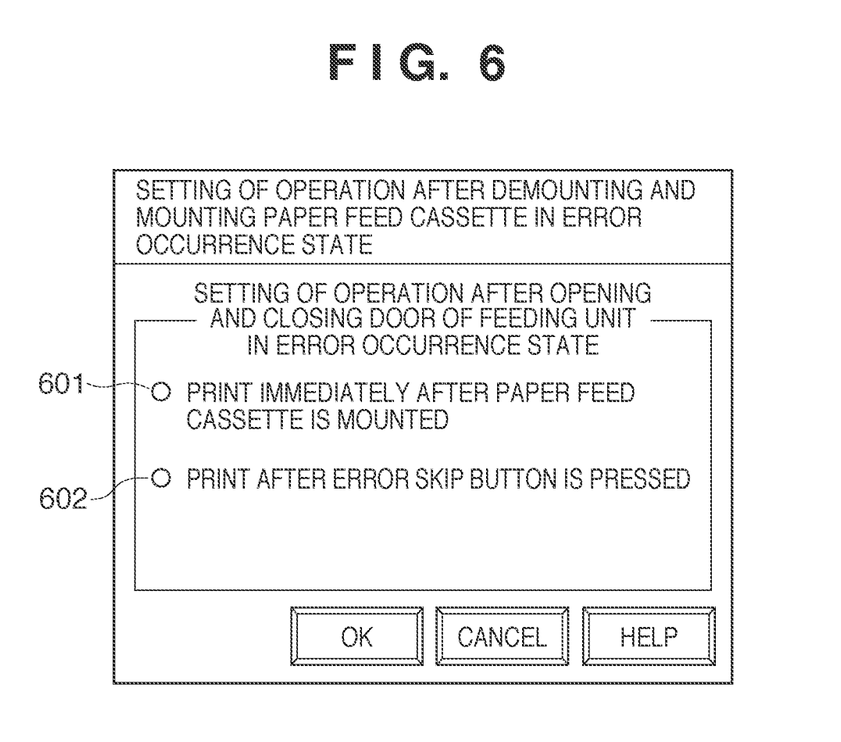
FIG. 6 is a view exemplifying a setting screen in a PC according to another embodiment of the present invention.

FIG. 6 is a view exemplifying a setting screen in a PC 101 according to the second embodiment. This setting screen is used to set an operation by a user operation upon occurrence of a paper size mismatch error. Information set here is sent from the PC 101 to a device 102 and stored in an area 313 of a non-volatile memory 218.

A radio button 601 is used to set to start printing immediately after mounting of a paper feed cassette in the feeding unit is detected. At this time, "0" is stored in the area 313 of the non-volatile memory 218. A radio button 602 is used to set to start printing when an error skip button 304 is pressed after mounting of a paper feed cassette is detected. At this time, "1" is stored in the area 313 of the non-volatile memory 218. When the value of the area 313 is "0", the operation in FIG. 4 is executed upon occurrence of a paper size mismatch error. To the contrary, when the value of the area 313 is "1", the device 102, upon occurrence of a paper size mismatch error, does not start printing even if a paper feed cassette is mounted, but starts printing in accordance with a sequence shown in FIG. 7 after the error skip button 304 is pressed.

Figure 7:
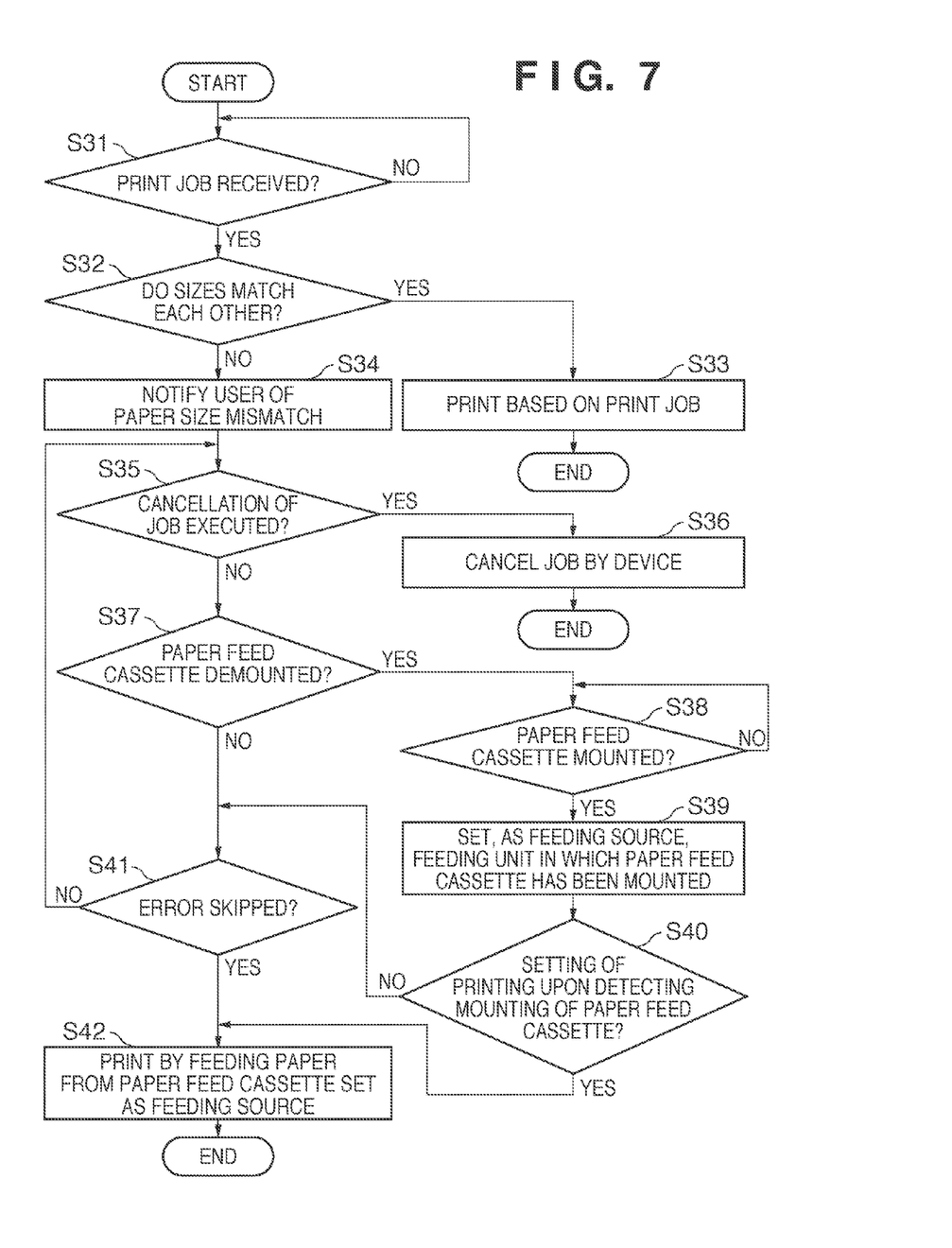
FIG. 7 is a flowchart for explaining processing by a device according to the other embodiment of the present invention.

FIG. 7 is a flowchart for explaining print control processing by the device 102 according to the second embodiment. A program for executing this processing is loaded into a RAM 203 in execution, and executed under the control of a CPU 201. Processes in S31 to S37 of FIG. 7 are the same as those in S1 to S7 of FIG. 4 described above, and a description thereof will not be repeated.

In S37, the device 102 uses a cassette open/close detection unit 215 to determine whether a paper feed cassette has been demounted from the feeding unit. If the device 102 determines that a paper feed cassette has been demounted, the process advances to S38, and the device 102 determines whether the paper feed cassette has been mounted in the feeding unit. If the device 102 determines that the paper feed cassette has been mounted, it determines that paper of the designated size has been loaded, or the paper feed cassette which contains paper of the designated size has been changed. The process advances to S39 to specify, from among a plurality of paper feed cassettes of device 102, the mounted paper feed cassette as a paper feed cassette serving as a feeding source. The process then advances to S40. In S40, the device 102 refers to a value set in the area 313 of the non-volatile memory 218. If the device 102 determines that the set value is "0", that is, it is set to print immediately after the paper feed cassette is mounted, the process advances to S42, and the device 102 executes the print job by feeding paper from a paper feed cassette 220 set (specified) as a feeding source in S39. If the device 102 determines in S40 that the set value is "1", that is, it is set to print only after the error skip button 304 is pressed, the process advances to S41, and the device 102 determines whether the error skip button 304 has been pressed. If the device 102 determines that the error skip button 304 has been pressed, the process advances to S42 and the device 102 executes the print job.

As described above, when a paper size mismatch occurs, paper of a designated size is sometimes contained in a paper feed cassette other than one set as a feeding source. In this case, according to the second embodiment, the user demounts the paper feed cassette which contains the paper, confirms the paper size, and mounts the paper feed cassette. By only this work, printing can be performed by feeding paper from a feeding unit having this paper feed cassette. Alternatively, the user demounts the paper feed cassette which contains the paper, confirms the paper size, mounts the paper feed cassette, and presses the error skip button. Then, printing can be done by feeding paper from a feeding unit having this paper feed cassette.

When there is a feeding unit having an alternative paper feed cassette, the user need not extract paper of a paper feed cassette set as a feeding source and replace it with paper of a target size. Also, the user need not cancel a print job, confirm a paper size set in a paper feed cassette, correct the setting of a print job in the PC, and print again.

By the setting of the device 102, the user can select either an operation of feeding paper from a paper feed cassette and starting printing when the user demounts the paper feed cassette from the feeding unit and mounts it in the feeding unit, or an operation of starting printing only after the user presses the error skip button. In accordance with the user requirements, it can be selected whether to prevent erroneous printing on paper of a different size, or omit an operation of pressing the error skip button.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-278946, filed Dec. 8, 2009, which is hereby incorporated by reference herein in its entirety.

What is claimed is:

1. A printing apparatus which has a plurality of sheet storage units, comprising:
a receiving unit configured to receive, from an external apparatus, a print job in which one of the plurality of sheet storage units and one of a plurality of sheet sizes are designated;
an obtaining unit configured to obtain a sheet size which is stored in association with the designated sheet storage unit;
a determination unit configured to determine whether the sheet size obtained by the obtaining unit matches the designated sheet size;
a detecting unit configured to detect that a sheet storage unit, among the plurality of sheet storage units, is closed after it is determined that the sheet size of a sheet stored in the designated sheet storage unit does not match the designated sheet size;
a changing unit configured to change a sheet feeding source from the designated sheet storage unit to the sheet storage unit detected by the detecting unit;
an accepting unit configured to accept a predetermined instruction from a user; and
a setting unit configured to set a first mode in which a sheet is fed from the sheet storage unit detected by the detecting unit in response to accepting the predetermined instruction or a second mode in which a sheet is fed from the sheet storage unit detected by the detecting unit without accepting the predetermined instruction;
wherein a sheet is fed from the sheet storage unit detected by the detecting unit in response to accepting the predetermined instruction in a case where the first mode is set, and a sheet is fed from the sheet storage unit detected by the detecting unit without accepting the predetermined instruction in a case where the second mode is set.

2. The printing apparatus according to claim 1, further comprising a notification unit configured to perform a predetermined notification to a user when it is determined that the sheet size of a sheet stored in the designated sheet storage unit does not match the designated sheet size.

3. The printing apparatus according to claim 1, further comprising a cancelling unit configured to cancel the received print job after it is determined that the sheet size of a sheet stored in the designated sheet storage unit does not match the designated sheet size.

4. The printing apparatus according to claim 1, further comprising a memory configured to store size information indicating a sheet size of a sheet stored in each of the plurality of sheet storage units,
wherein the determination unit performs the determination based on the size information stored in the memory.

5. A control method for a printing apparatus which has a plurality of sheet storage units, the control method comprising:
receiving, from an external apparatus, a print job in which one of the plurality of sheet storage units and one of a plurality of sheet sizes are designated;
obtaining a sheet size which is stored in association with the designated sheet storage unit;
determining whether the sheet size obtained by the obtaining unit matches the designated sheet size;
detecting that a sheet storage unit, among the plurality of sheet storage units, is closed after it is determined that the sheet size of a sheet stored in the designated sheet storage unit does not match the designated sheet size;
changing a sheet feeding source from the designated sheet storage unit to the sheet storage unit detected in the detecting unit;
accepting a predetermined instruction from a user; and
setting a first mode in which a sheet is fed from the sheet storage unit detected by the detecting step in response to accepting the predetermined instruction or a second mode in which a sheet is fed from the sheet storage unit detected by the detecting step without accepting the predetermined instruction;
wherein a sheet is fed from the sheet storage unit detected by the detecting step in response to accepting the predetermined instruction in a case where the first mode is set, and a sheet is fed from the sheet storage unit detected by the detecting step without accepting the predetermined instruction in a case where the second mode is set.

6. A non-transitory computer readable storage medium for storing a computer program for controlling a printing apparatus which has a plurality of sheet storage units, the computer program comprising:
a code to receive, from an external apparatus, a print job in which one of the plurality of sheet storage units and one of a plurality of sheet sizes are designated;
a code to obtain a sheet size which is stored in association with the designated sheet storage unit;
a code to determine whether the sheet size obtained by the obtaining unit matches the designated sheet size;
a code to detect that a sheet storage unit, among the plurality of sheet storage units, is closed after it is determined that the sheet size of a sheet stored in the designated sheet storage unit does not match the designated sheet size;
a code to change a sheet feeding source from the designated sheet storage unit to the detected sheet storage unit;
a code to accept a predetermined instruction from a user; and
a code to set a first mode in which a sheet is fed from the sheet storage unit detected by the detect code in response to accepting the predetermined instruction or a second mode in which a sheet is fed from the sheet storage unit detected by the detect code without accepting the predetermined instruction;
wherein a sheet is fed from the sheet storage unit detected by the detect code in response to accepting the predetermined instruction in a case where the first mode is set, and a sheet is fed from the sheet storage unit detected by the detecting code without accepting the predetermined instruction in a case where the second mode is set.

* * * * *